United States Patent [19]

Leikarts

[11] Patent Number: 4,582,001
[45] Date of Patent: Apr. 15, 1986

[54] SHELF CONNECTOR ASSEMBLY

[75] Inventor: A. Juris Leikarts, Gallatin, Tenn.

[73] Assignee: Nashville Wire Products, Nashville, Tenn.

[21] Appl. No.: 583,825

[22] Filed: Feb. 27, 1984

[51] Int. Cl.[4] .................. A47B 9/00; A47B 47/00; A47G 29/02; B25G 3/00

[52] U.S. Cl. ..................... 108/106; 108/144; 211/187; 248/243; 403/235

[58] Field of Search ............... 108/144, 152, 154, 156, 108/159, 106, 110; 248/245, 243; 211/187, 190, 193, 208; 403/233, 235

[56] References Cited

U.S. PATENT DOCUMENTS

| | | | |
|---|---|---|---|
| 2,962,170 | 11/1960 | Best | 211/182 |
| 3,395,811 | 8/1968 | Bellock | 211/178 |
| 4,079,678 | 3/1978 | Champagne | 108/110 |
| 4,230,052 | 10/1980 | Champagne | 211/187 |

Primary Examiner—William E. Lyddane
Assistant Examiner—Gerald A. Anderson
Attorney, Agent, or Firm—Harrington A. Lackey

[57] ABSTRACT

A shelf connector assembly including cooperating dove-tail connector members respectively attached to the shelf and an upright post, in which the connector members are provided with mating tapering flanges for cooperative longitudinal slidable locking engagement in selective elevated positions along the post for varying the height of the shelf relative to the post or posts.

One dove-tail connector member may be permanently secured to the side frame of the shelf, while the other connector member is in the form a a U-shaped clip member adapted to slip fit around the upright post in various vertical positions.

In a modified form of the shelf connector assembly, one cooperating dove-tail connector member may be attached to the shelf while the other dove-tail connector member, in the form of a clip, may be affixed to the transverse outer frame member of an adjacent shelf so that two adjacent shelves may be connected together in a coplanar relationship.

8 Claims, 12 Drawing Figures

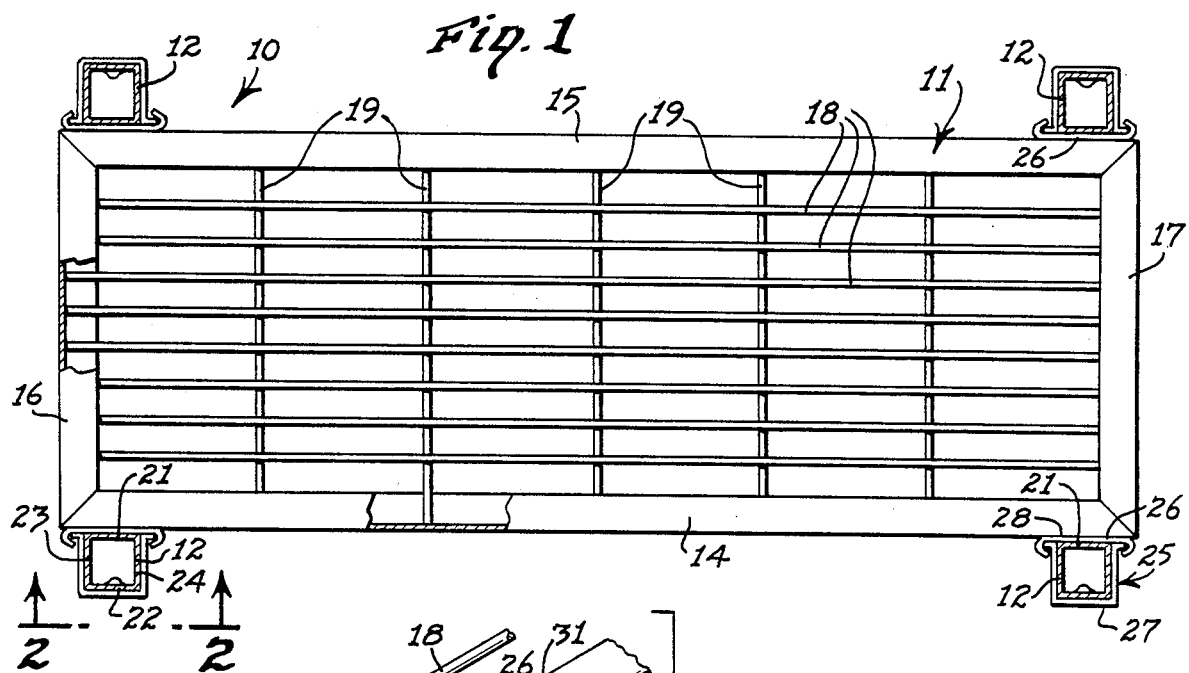
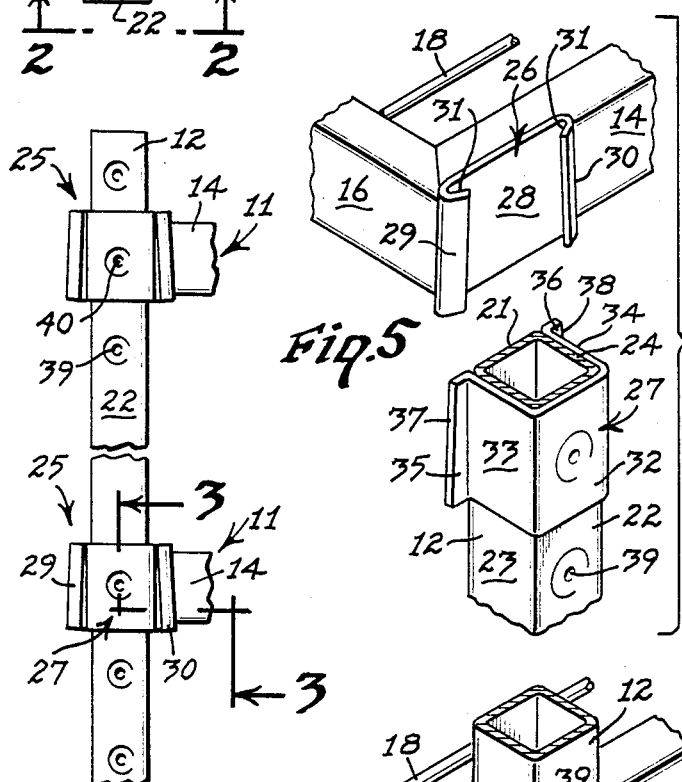
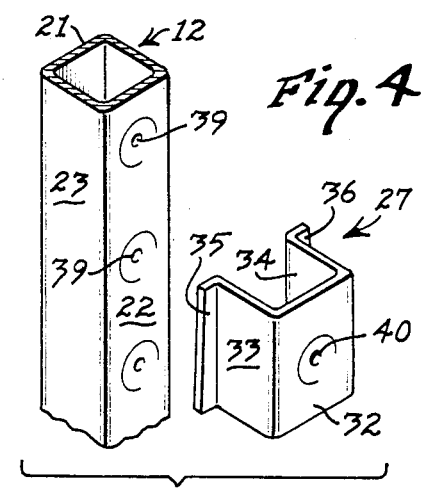
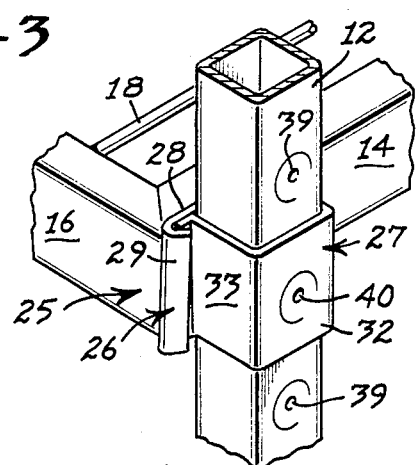
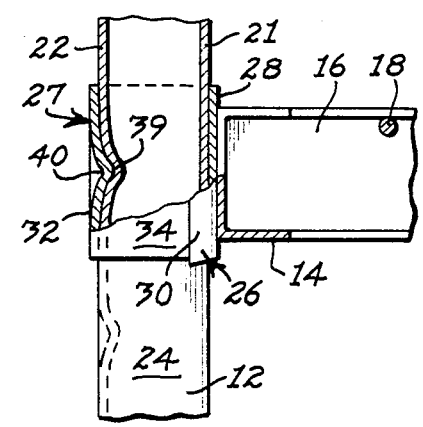

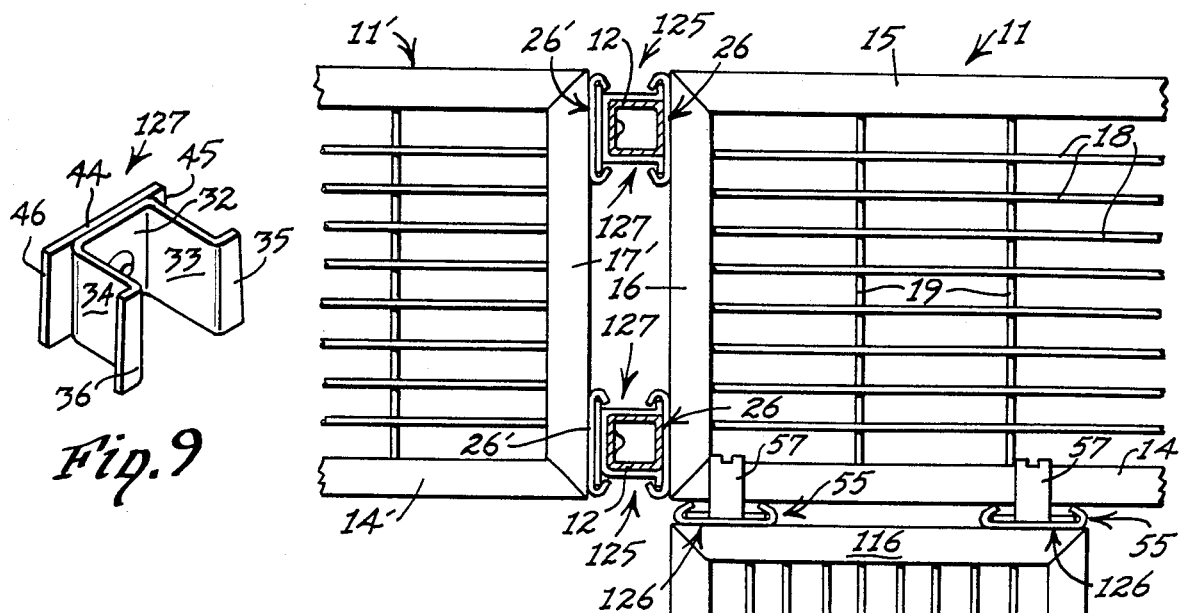
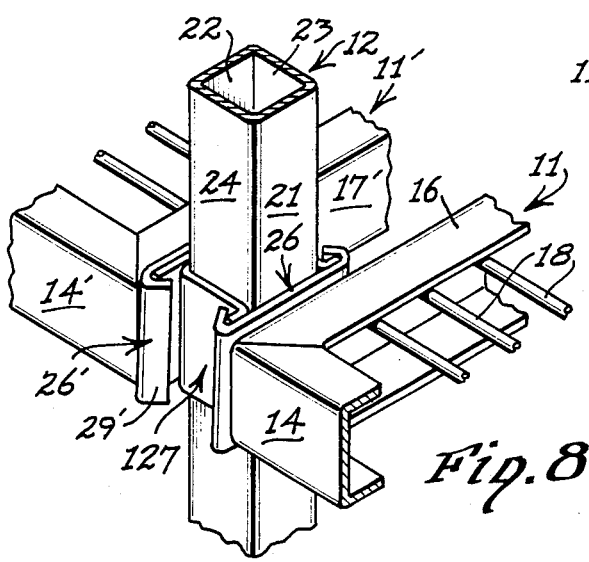
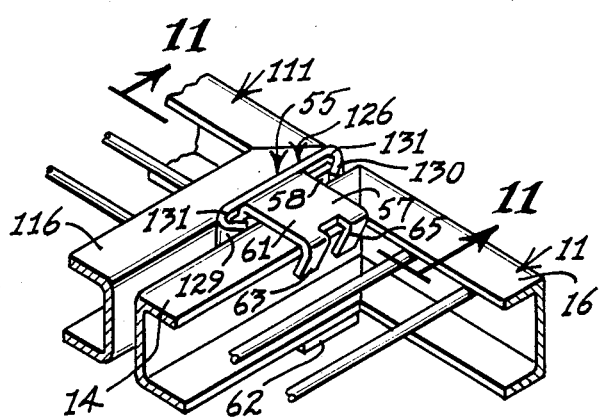
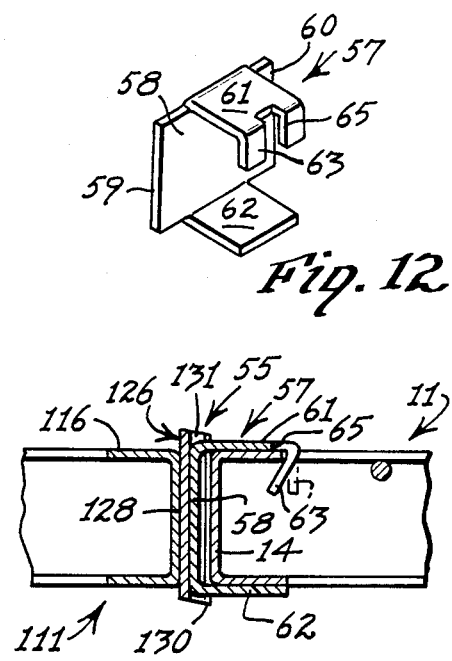

SHELF CONNECTOR ASSEMBLY

BACKGROUND OF THE INVENTION

This invention relates to shelf assemblies, and more particularly to an assembly for connecting a shelf to an upright post or posts, or to another shelf.

Heretofore, in shelf assemblies, and more particularly in "knock-down" shelf assemblies, various connector devices have been devised for connecting the corners of the shelves to corresponding upright posts. One of the most common, and perhaps most prevalent, connector assemblies includes various types of bracket and bolt assemblies for bolting the corners of the shelves to the posts. However, in order to adjust the height of the shelf and post, the bolts must be loosened, tightened, removed, and re-inserted, all of which operations require the use of a tool, such as a screw driver, wrench or pliers, or a combination of such tools. Such operations require considerable time, since in a shelf assembly incorporating a plurality of shelves, one bolt for each of the four corners of the multitude of shelves must be manipulated. In such operations, the threads of bolts become stripped, bolts become lost, and in some corner connections, the bolt shanks bear the entire weight of a loaded shelf, thereby exerting substantial sheer stresses upon the bolts.

The following U.S. and foreign patents disclose other types of connectors for connecting the corners of shelves to upright members:

- U.S. Pat. No. 3,138,123, Maslow, June 23, 1964
- U.S. Pat. No. 3,208,408, Maslow, Sept. 28, 1965
- U.S. Pat. No. 3,208,777, Maslow, Sept. 28, 1965
- U.S. Pat. No. 3,225,720, Maslow, Dec. 28, 1965
- U.S. Pat. No. 3,245,365, Doherty, Apr. 12, 1966
- U.S. Pat. No. 3,316,864, Maslow, May 2, 1967
- U.S. Pat. No. 3,344,756, Kelson, Oct. 3, 1967
- U.S. Pat. No. 3,424,111, Maslow, Jan. 28, 1969
- U.S. Pat. No. 3,523,508, Maslow, Aug. 11, 1970
- U.S. Pat. No. 3,675,598, Kesilman et al, July 11, 1972
- U.S. Pat. No. 3,757,705, Maslow, Sept. 11, 1973
- U.S. Pat. No. 3,858,530, Jaffee et al, Jan. 7, 1975 (Bolt-type)
- U.S. Pat. No. 3,874,511, Maslow, Apr. 1, 1975
- U.S. Pat. No. 3,927,769, Maslow, Dec. 23, 1975
- U.S. Pat. No. 855,715, France, Feb. 19, 1940

All of the recent Maslow patents commencing with the Maslow U.S. Pat. No. 3,424,111, disclose tapered corner collars fixed to, or forming a part of, the shelf and adapted to cooperate with a pair of truncated-conical sleeves disposed about corresponding grooved upright posts.

The Kesilman U.S. Pat. No. 3,675,598, discloses cooperating tapered sleeves and corner collars for shelves in which the upright post is not grooved, and therefore requires a set screw for securing the conical sleeves to the post.

There is another corner connector for shelves and upright posts commercially available and produced by Gillis & Associates, Inc., of Prospect Heights, Ill., in their "Cari-All" shelf assemblies. The "Cari-All" corner connector includes a square U-shaped clip adapted to fit around three corresponding sides of an upright post. However, the corners of the clip are notched to engage corresponding recesses in the corners of the square tube. The clip is provided with hook members projecting from both sides of the clip to receive horizontal rods of the corresponding shelf. Thus, this "Cari-All" Clip is only adaptable for connecting wire-type shelves.

SUMMARY OF THE INVENTION

It is therefore an object of this invention to provide a shelf connector assembly of relatively simple and inexpensive construction adapted for securely connecting the corner portion of a shelf to a corresponding upright post, without the use of bolts, screws, or tools. Moreover, the connector assembly made in accordance with this invention may be vertically adjusted to accommodate shelves at different heights or elevations relative to the corner posts.

More specifically, the shelf connector assembly made in accordance with this invention includes a pair of connectors having cooperating dove-tail flanges, one connector being fixed to the corner portion of the shelf, while the other connector is adapted to be affixed to the upright post. The connector attached to the shelf may be permanently fixed at the desired location near the corner of the shelf, while the connector affixed to the upright post is preferably slip-fitted over the post to facilitate removal, attachment, and vertical adjustment relative to the post. Preferably, the connector affixed to the post is a U-shaped clip member adapted to slip fit around three sides of the upright post, and preferably around a square tubular post. The extremities of the side portions of the clip define lateral dove-tail flanges adapted to cooperate with a pair of oppositely directed flanges forming a part of the connector affixed to the shelf. The dove-tail flanges of both connector members are designed to diverge in the same longitudinal direction for slidable cooperation. Preferably the connector on the shelf is adapted to slide down over the top of the corresponding flanges of the clip member, with the effect of increasing the binding or locking relationship between the connectors as the shelf descends relative to the upright post.

Also in a preferred form of the invention, the U-shaped clip member is provided with an inward projecting detent or projection adapted to cooperatively engage a corresponding recess in the corresponding surface of the upright post. Preferably, a plurality of vertically spaced recesses are formed in the post to permit the clip with its projection to engage corresponding recesses at different elevations along the post to provide for the vertical adjustment of the shelf relative to its corresponding supporting posts.

The opposed arm members of the U-shaped clip member have sufficient flexibility or elasticity to permit them to bind together against the corresponding opposite surfaces of the post, as the cooperating connector on the shelf descends into tighter locking engagement with the flanges of the clip member.

In order to remove a shelf from the post, the shelf may merely be raised vertically to cause its connectors to disengage, and move upwardly away from, the corresponding dove-tail flanges of the clip members. Occasionally, a hammer may be required to deliver an upward thrust to the shelf member to disengage the corresponding connectors.

Each of the connector members may be made from a single piece of sheet material, preferably metal, and bent into the desired shapes to form the corresponding cooperating dove-tail flanges. The corresponding projection and recesses may be formed by deformation of the respective metal parts by a pointed tool or punch.

In a modified form of the shelf connector assembly, the clip member is modified in construction to attach to the transverse outer frame member or rail of an adjacent shelf so that both adjacent shelves may be connected together in a substantially coplanar relationship. In this modified form of the shelf connector assembly, the clip member is provided with vertically spaced arm members which extend above and below the top and bottom surfaces of the transverse frame member of the adjacent shelf and support a pair of dove-tail shaped flanges which cooperate with the other dove-tail connector member connected to an opposed frame surface of a shelf.

BRIEF DESCRIPTION OF THE DRAWINGS

FIG. 1 is a top plan view of a single shelf member supported upon four upright posts by corresponding connector assemblies made in accordance with this invention, with portions broken away;

FIG. 2 is a fragmentary front elevational view of the left front corner post and corresponding connector assemblies supporting a pair of vertically spaced shelves, with portions of the posts broken away, and taken along the line 2—2 of FIG. 1;

FIG. 3 is an enlarged fragmentary section taken along the line 3—3 of FIG. 2;

FIG. 4 is an enlarged fragmentary, exploded, perspective view of one of the posts and a U-shaped clip member disassembled from the post;

FIG. 5 is a fragmentary exploded perspective view of the shelf connector member affixed to the left front corner portion of the shelf preparatory for receiving the clip member connector fitted about the corresponding post, shown fragmentarily;

FIG. 6 is a view similar to FIG. 5 in which the connector members are assembled in operative position.

FIG. 7 is a fragmentary top plan view of a pair of first modified connector assemblies connecting a pair of shelf members in end-to-end relationship upon a pair of upright posts, and also a pair of second modified connector assemblies connecting a pair of shelf members adjacent to each other without any intermediate upright posts;

FIG. 8 is an enlarged fragmentary top perspective view of the first modified shelf connector assembly disclosed in FIG. 7;

FIG. 9 is a top perspective view of the clip member utilized in the first modified connector assembly;

FIG. 10 is an enlarged fragmentary top perspective view of the second modified connector assembly disclosed in FIG. 7;

FIG. 11 is a fragmentary sectional elevation taken along the line 11—11 of FIG. 10; and FIG. 12 is a top perspective view of the clip member utilized in the second modified connector assembly.

DESCRIPTION OF THE PREFERRED EMBODIMENT

Referring now to the drawings in more detail, FIG. 1 discloses a shelf assembly 10 including a rectangular top shelf 11 supported adjacent its four corners by corresponding upright posts 12.

Although the construction of the top shelf 11 may vary, the particular top shelf 11 disclosed in FIG. 1 includes a rectangular frame formed from parallel front and rear outer frame members 14 and 15 and left and right end outer frame members 16 and 17. Each of the outer frame members 14–17 is preferably made from steel channel members, all of which open inwardly toward the center of the shelf 11.

The top shelf 11 is of an open construction including a plurality of transversely spaced longitudinally extending wire rods 18, the ends of which are fixed to, such as by welding, the webs of the end outer frame members 16 and 17. Extending perpendicular to the longitudinal wire rods 18 are a plurality of longitudinally spaced transverse wire rods 19 extending front-to-rear, and whose ends are fixed to, such as by welding, the webs of the front and rear outer frame members 14 and 15 respectively.

The above described construction of the top shelf 11 is conventional.

Each of the upright posts 12 are also of conventional construction, but for the purposes of this invention, are preferably square in cross-section, and preferably made of square tubular sections.

For purposes of nomenclature, the sides of the square tubular upright posts 12 include an inside wall surface 21 opposing the corresponding rails of the shelf 11, an outside wall surface 22, which is parallel to the inside wall surface 21, and side wall surfaces 23 and 24, parallel to each other and connecting the inside and outside wall surfaces 21 and 22.

Each shelf connector assembly 25 for adjustably connecting each shelf 11 to the four upright posts 12 includes a pair of co-operating elements, namely, a shelf connector member 26 and a clip member 27.

The shelf connector or shelf connector member 26 is preferably a substantially planar base plate 28 terminating in end portions turned in toward each other to form a pair of opposed dove-tailed connector flanges 29 and 30. The base plate 28 is permanently secured, such as by welding, to the web of a corresponding outer frame member 14 or 15. The base plates 28 of the shelf connectors 26 connecting the front posts 12 to the front rail or outer frame member 14 are both permanently secured to the web at the opposite ends of the channel-shaped front outer frame member 14, as disclosed in FIGS. 1 and 5. The base plate 28 is secured in such a position that the flanges 29 and 30 are disposed generally upright, but projecting forwardly and inwardly. The flanges 29 and 30 also taper upward, so that they diverge downwardly, forming spaced grooves 31 between each flange 29 and 30 and the corresponding opposed portion of the base plate 28.

Each clip member 27 is preferably made of a single piece of flat metal bent to have a U-shaped cross-section whose inner dimensions correspond with the exterior surfaces 23, 22 and 24 of each post 12. Each clip member 27 has a substantially planar or flat bight portion 32, a substantially planar arm member 33 and an opposed parallel substantially planar arm member 34. Both of the arm members 33 and 34 project inwardly from the connecting bight portion 32. Thus, when the clip member 27 is fitted or secured around a corresponding post 12, the bight portion 32 will engage substantially flush against the outside post surface 22, while the arm member 33 abuts substantially flush against the side surface 23 and the arm member 34 abuts substantially flush against the side surface 24 of the post 12.

The free ends of the arm members 33 and 34 terminate in a pair of dove-tailed clip flanges 35 and 36, which are substantially perpendicular to the arm members 33 and 34 and are directed outwardly away from each other and substantially coplanar with each other and with the inside surface 21 of the post 12.

The outside edges 37 and 38 of the respective dove-tail flanges 35 and 36 are tapered so that they also diverge downwardly to be received in the corresponding dove-tailed channels 31 formed by the flanges 29 and 30 of the shelf connector 26.

In a preferred form of the invention, the outside surface 22 of each post 12 includes a plurality of vertically spaced recesses or dimples 39 for reception of a protuberance 40 projecting inward from the bight portion 32 of the clip member 27, at the elevation corresponding to the location of the recess 39. The protuberance 40, as well as the recesses 39, may be formed with an appropriate punch tool.

The size and shape of the clip member 27 is such that it may be slip-fitted snugly about the corresponding three side surfaces of each rectangular post 12. The protuberance 40 and the corresponding recess 39 cooperate with each other to assist in holding the clip member 27 at the corresponding elevation on the post 12.

In the operation of the invention, any number of shelves 11, such as the two shelves 11 disclosed in FIG. 2, may be assembled upon the same four corner posts 12. Each shelf 11 is provided with four shelf connector members 26, as previously described, and each corner post 12 receives a clip member 27 for each shelf 11. Each set of four clip members 27 on the four posts 12 are located at the same elevation to support one shelf 11 at that elevation. Another set of four clip members 27 may be located below or above the first set of clip members in order to connect another shelf 11 to the posts 12 at the elevation of the other set of clip members 27.

As disclosed in FIG. 4, the clip member 27 is forced over the corresponding post 12 so that the projection or protuberance 40 will engage a corresponding recess 39, as disclosed in FIG. 5. After the four clip members 27 are set at the same elevation on the four corner posts 12, a shelf 11 is lowered between the posts 12, with each shelf connector 26 above, and in substantial vertical alignment with, its corresponding clip member 27. As the shelf 11 is lowered (FIG. 5), the channels or grooves 31 receive the upper narrow ends of the dove-tail flanges 35 and 36 of the clip member 27. Further lowering of the shelf 11 causes the dove-tailed edges 37 and 38 to slide relative to, and bind in, the outer edges of the respective grooves 31, until no further downward movement can be effected. This cooperation of the dove-tailed channels 31 and the dove-tailed flanges 35 and 36 not only support the corresponding shelf 11 in a locked position at the desired elevation, but also tend to squeeze the arm members 33 and 34 toward each other to exert frictional pressure against the side surfaces 23 and 24 of the corresponding posts 12, to more securely hold the clip members 27 against their corresponding posts 12.

In order to remove a shelf 11 from the post 12 it is only necessary to force the shelf 11 upwardly, either by hand, or by light impact or pressure from a tool, such as a hammer. In this manner, the shelf connectors 26 slidably disengage the corresponding flanges 35 and 36 of the respective clip members 27. After each shelf connector 26 is clear of its corresponding clip member 27, the clip member 27 may be easily removed for storage, or for re-application to the post 12 at a different elevation.

Thus, the entire operation is conducted without the assistance of any tools, except possibly a hammer as described above.

Each of the connector members 26 and 27 is a unitary, one-piece member made of flat or strap metal, each of which may be easily formed by appropriate bending of the metal to form the respective connectors. The optional projections 40 and recesses 39 may be formed by a simple punch tool operation.

Accordingly, a shelf connector assembly 25 has been designed which may be inexpensively manufactured and utilized for simple and rapid assembly and disassembly, as well as for vertical adjustment, of shelves or shelf members on their supporting upright posts.

It is possible to shape the clip member 27 to have a round cross-section for snugly engaging a post having a circular cross-section, if desired.

FIG. 7 discloses a first modified connector assembly 125 which is adapted to secure adjacent ends of two shelves 11 and 11' to the same pair of upright posts 12. Each shelf connector assembly 125 includes a shelf connector member 26 fixed, such as by welding, to the end rail 16 of the shelf 11, in the same manner as the shelf connector members 26 are secured to the front and rear rails 14 and 15 of the shelf 11 in FIG. 1. Each shelf connector member 26 is in dove-tail cooperative engagement with a corresponding clip member 127, as best disclosed in FIGS. 8 and 9. Each clip member 127 is identical in construction to the clip member 27 having the same parts 32-36, with the exception that a dove-tail connector plate 44, having opposite, outwardly directed, inclined dove-tail edges or auxiliary flanges 45 and 46, is welded to the outer surface of the bight portion 32. The distance between the downwardly diverging dove-tail flanges 45 and 46 is substantially identical to the distance between the dove-tail flanges 35 and 36. Thus, each dove-tail plate 44 is adapted to cooperatively and slidingly engage a corresponding shelf connector member 26', identical in construction to a connector member 26. The connector members 26' are fixed, such as by welding, to the side surfaces of the end rail or end outer frame member 17' of the shelf 11'. The dove-tail connector plate 44 fits into its corresponding shelf connector member 26' in the same manner as the flanges 35 and 36 of the same clip member 127 cooperatively engage the flanges 29 and 30 of the corresponding connector member 26, as best disclosed in FIGS. 7 and 8.

FIG. 7 also discloses a second modified form of connector assembly 55, two of which are shown connecting the front rail 14 of the shelf member 11 to the end rail or outer end frame member 116 of the shelf member 111, without any intervening upright posts 12. Each connector assembly 55 includes a shelf connector member 126 identical in construction to the connector member 26, but welded to the outer surface of the end rail 116 so that the corresponding dove-tail inturned flanges 129 and 130 diverge vertically downward in the same manner as the connector members 26 mounted on the shelf 11 in FIG. 1.

A clip member 57, of a construction different from clip members 27 and 127, is designed so that it fits in a fixed position upon the front rail 14 of the shelf member 11, for cooperative engagement with each respective shelf connector member 126.

As best disclosed in FIGS. 10-12, the clip member 57 includes a planar dove-tail member or plate 58 having outwardly directed opposite dove-tail flanges or edges 59 and 60. The dimensions of the dove-tail plate 58 and the angle of divergence of the dove-tail flanges 59 and 60 correspond with the dimensions of the shelf connector member 126 so that the plate 58 may be slideably and lockingly received within the channels 131 formed by the dove-tail flanges 129 and 130 of the connector members 126. Fixed to the top and bottom edges of the dove-tail plate 58 are an upper arm member 61 and a lower arm member 62, respectively, extending inwardly or rearwardly from the dove-tail plate 58. The arm members 61 and 62 project above and below the corresponding surfaces of the front rail 14 of the shelf 11. The upper arm member 61 may be provided with a depending flange or hook 63 to engage behind the rail 14. Thus, the arm members 61 and 62 snugly receive the frame rail 14 to fix the clip member 57 in its operative fixed position on the front rail 14 for cooperating with the connector members 126 to secure the shelf 111 adjacent to the shelf 11. The flange or hook 63 may be bent as shown in FIG. 11, to retain the clip member 57 on the rail 14. The arm member 61 and the flange 63 may be provided with a notch 65 to receive or straddle a horizontal wire, such as wire 18 or 19, if necessary.

Thus, in the operation of the connector sassemblies 55, when it is desired to attach a shelf, such as shelf 111, to another supported shelf, such as shelf 11, either end-to-end, side-to-side, or end-to-side, as disclosed in FIG. 7, clip members 57 equal in number and spacing to the connector members 126, are clipped to the corresponding rail, such as the front rail 14 of the shelf 11. The shelf connector members 126 are welded or otherwise fixed to the appropriate rail, such as the end rail 116 of the shelf 111, at the appropriately spaced positions, such as those disclosed in FIG. 7. The shelf 111 is then lowered with its connector members 126 vertically aligned with the dove-tail plates 58 of the respective clip members 57 so that the dove-tail edges 59 and 60 slide downward within the corresponding grooves or channels 131 of the shelf connector members 126 until the plates 58 are snugly wedged within the connector members 126. Optimally, when the clip member 57 is locked in the corresponding connector member 126, the shelves 11 and 111 are coplanar, as disclosed in FIGS. 10 and 11.

The connector members 126 are made in the same manner as the connector members 26. The clip members 57 may be made of a single piece of sheet metal by cutting and bending to form the arm members 61 and 62 integrally with the dove-tail plate member 58, as disclosed in FIG. 12. The arm members 61 and 62 may be slightly elastic or resilient to slip-fit and "clip" about the corresponding rail member 14.

What is claimed is:

1. An assembly for connecting a shelf having an outer frame member to an upright post, comprising:
   (a) a dove-tail connector member having a longitudinal dimension and a lateral dimension and a pair of laterally spaced, opposed connector flanges projecting in opposite lateral directions,
   (b) means securing said connector member to the outer frame member of a shelf so that said longitudinal dimension is substantially vertical, and said connector flanges diverge in one longitudinal vertical direction,
   (c) a clip member having opposed arm members adapted to receive a portion of an upright post in an operative fixed position so that said arm members engage opposite sides of the upright post in said operative position,
   (d) said clip member having elongated, transversely spaced, clip flanges projecting in laterally opposite directions from said corresponding arm members and in corresponding opposite directions from said connector flanges, said clip flanges diverging in the same longitudinal vertical direction as said connector flanges, and
   (e) said connector flanges and said clip flanges being adapted to cooperate in longitudinal slidable engagement to lock said dove-tail connector member to said clip member and to secure the shelf to the post, in said operative position said arm members are sufficiently yieldable that they will be forced toward each other in binding engagement with the opposite sides of an upright post as said connector member moves longitudinally into locking engagement with said clip member.

2. The invention according to claim 1 in which said arm members have first end portions terminating in said corresponding clip flanges, and second end portions connected by a bight portion adapted to engage a portion of the upright post between said arm members.

3. The invention according to claim 2 in which said opposed arm members are adapted to slip-fit over the opposing wall surfaces of the upright post in operative position.

4. The invention according to claim 3 in which the upright post adapted to be connected to the shelf has a square cross-section, said opposed arm members being substantially parallel, and said bight portion being substantially planar and perpendicular to said arm members, whereby said bight portion and said arm members are in substantial flush engagement with three corresponding surfaces of the upright post.

5. The invention according to claim 4 further comprising a plurality of vertically spaced recesses in one wall surface of said upright post, and a projection extending inwardly from said bight portion for selective cooperation with any of said recesses when said clip member is in an operative position engaging said upright post at an elevation corresponding to one of said recesses.

6. The invention according to claim 1 in which said connector flanges diverge downwardly and are directed laterally toward each other, and said clip flanges diverge downwardly and project laterally in opposite directions from each other, whereby said dove-tail connector member on the shelf may be moved downward into locking engagement with said clip member in said operative position.

7. The invention according to claim 4 in which said clip flanges are substantially coplanar with the surface of the upright post not engaged by said arm members.

8. The invention according to claim 2 further comprising a pair of laterally opposed auxiliary flanges fixed to said bight portion, said auxiliary flanges being substantially parallel to said clip flanges, said auxiliary flanges being adapted to cooperatively engage the connector flanges of another dove-tail connector member.

* * * * *